United States Patent [19]

Stutz et al.

[11] 4,448,946

[45] May 15, 1984

[54] PROCESS FOR THE PREPARATION OF NONCELLULAR POLYURETHANE ELASTOMERS BASED ON 4,4-DIISOCYANATO-1,2-DIPHENYLETHANE

[75] Inventors: Herbert Stutz, Karlsruhe; Karl H. Illers, Otterstadt; Herbert Haberkorn, Gruenstadt; Walter Heckmann, Weinheim, all of Fed. Rep. of Germany

[73] Assignee: BASF Aktiengesellschaft, Ludwigshafen, Fed. Rep. of Germany

[21] Appl. No.: 418,717

[22] Filed: Sep. 16, 1982

[30] Foreign Application Priority Data

Sep. 26, 1981 [DE] Fed. Rep. of Germany ....... 3138421

[51] Int. Cl.$^3$ .............................................. C08G 18/76
[52] U.S. Cl. ......................................... 528/67; 528/44
[58] Field of Search .................................. 528/67, 44

[56] References Cited

U.S. PATENT DOCUMENTS 3,940,371 2/1976 Case ..................................... 528/67
3,998,768 12/1976 Pettit ..................................... 525/166

FOREIGN PATENT DOCUMENTS 1069602 5/1967 United Kingdom .

Primary Examiner—H. S. Cockeram
Attorney, Agent, or Firm—J. D. Michaels

[57] ABSTRACT

The invention relates to a process for the manufacture of noncellular polyurethane elastomers by reacting 4,4'-diisocyanato-1,2-diphenylethane or diisocyanato-1,2-diphenylethane isomer mixtures with a 4,4'-diisocyanato-1,2-diphenylethane content in excess of 95 percent by weight, higher molecular weight polyhydroxyl compounds and low molecular weight chain extenders optionally in the presence of auxiliaries and additives.

The polyurethane elastomers produced in accordance with this invention excel by a greater hardness and improved mechanical properties compared with polyurethane elastomers based on 4,4'-diphenylmethane diisocyanate with otherwise comparable composition.

5 Claims, No Drawings

PROCESS FOR THE PREPARATION OF NONCELLULAR POLYURETHANE ELASTOMERS BASED ON 4,4-DIISOCYANATO-1,2-DIPHENYLETHANE

BACKGROUND OF THE INVENTION

1. Field of the Invention

This invention relates to the field of noncellular elastomers. The elastomers are polyurethanes prepared from polyhydroxyl compounds and a specific aromatic diisocyanate.

2. Description of the Prior Art

The preparation of polyurethane elastomers by reacting essentially linear higher molecular weight polyhydroxyl compounds such as hydroxyl group-containing polyesters of alkylene glycols and aliphatic dicarboxylic acids or hydroxy carboxylic acids or hydroxyl group-containing polyethers based on polytetrahydrofuran, chain extenders such as short chained diols or diamines and organic diisocyanates such as 1,6-hexamethylene diisocyanate, isophorone diisocyanate, 2,4-toluene diisocyanate, 4,4'-diphenylmethane diisocyanate and 1,5-naphthylene diisocyanate is the subject of numerous publications. These polyurethane elastomers are clearly described, for example, in the *Plastics Handbook*, vol. VII, Polyurethanes by R. Vieweg and H. Hoechtlen, Carl Hanser Publishers, Munich 1966, starting at page 206, or Plastics 68 (1978) 12, pages 819–825.

British Pat. No. 1,069,602 describes coating agents with improved light fastness for the preparation of which adducts of 4,4'-, 2,4'- and 2,2'-diisocyanato-1,2-diphenylethane or mixtures of the mentioned isomers and trimethylolpropane, hexane triol or pentaerythritol are reacted with polyoxyalkylene glycols having molecular weights from 550 to 20,000. Coating agents produced in this manner do not contain any or only small quantities of crystalline polymer segments and are, therefore, not suited for the preparation of molded polyurethane elastomer parts.

With a number of very important applications where the material is exposed to extreme dynamic or thermal stresses such as, for example, in highly stressed track rollers, tires and wheels, vibration dampening molded parts in machine and vehicle construction, torsionally elastic couplings, polyurethane elastomers based on 4,4'-diphenylmethane diisocyanate prove to be deficient. To date the very expensive 1,5-naphthylene diisocyanate or physiologically extremely hazardous chain extenders such as 3,3'-dichloro-4,4'-diaminodiphenylmethane had to be used for such applications.

SUMMARY OF THE INVENTION

The purpose of this invention was to create polyurethane elastomers with good mechanical properties. The use of expensive and/or physiologically hazardous raw materials was to be avoided as much as possible.

It was found that polyurethane elastomers with extremely good mechanical properties are obtained from 4,4'-diisocyanato-1,2-diphenylethane.

Thus, this invention is a process for the preparation of polyurethane elastomers by reacting (a) an organic polyisocyanate with (b) a higher molecular weight polyhydroxyl compound and (c) chain extenders, optionally, in the presence of (d) auxiliaries and/or additives wherein the organic isocyanate used is 4,4'-diisocyanato-1,2-diphenylethane or a diisocyanato-1,2-diphenylethane isomer mixture with a 4,4'-diisocyanato-1,2-diphenylethane content of at least 95 percent by weight.

Compared with polyurethane elastomers based on 4,4'-diisocyanatodiphenylmethane, polyurethane elastomers of 4,4'-diisocyanato-1,2-diphenylethane with comparable composition excel by a much higher degree of hardness and improved mechanical moduli. The elasticity modulus and the shear modulus are constant from room temperature up to about 150° C., that is, they are not a function of temperature. The softening temperatures of the polyurethane elastomers produced in accordance with this invention are approximately 200° C. and above.

This result could not be anticipated in any way since it could not be expected that an extension of the bridge member between the two phenyl radicals by a methylene group would alter the properties of the resultant polyurethane elastomers in such a drastic fashion.

DESCRIPTION OF THE PREFERRED EMBODIMENTS

As previously stated, the polyurethane elastomers of this invention are produced from 4,4'-diisocyanato-1,2-diphenylethane. Mixtures of 4,4'-diisocyanato-1,2-diphenylethane with the 2,4'- and/or 2,2'-isomers are also suitable if the content of 4,4'-diisocyanatodi-1,2-phenylethane in the mixture exceeds 95 percent by weight, preferably 97 percent by weight.

Suitable higher molecular weight polyhydroxyl compounds have molecular weights of 700 to 10,000, preferably 800 to 5000, and functionalities of 2 to 6, preferably of 2 to 3. It may also be advantageous to use monofunctional compounds in small amounts. If these compounds are used, however, they may be used only in such quantity that the average functionality does not drop below two hydroxyl groups per molecule.

Examples of higher molecular weight polyhydroxyl compounds include: hydroxyl group-containing polyesters, polyester amides, polyethers, polyether esters, polyacetals and polythioethers. Preferably used are essentially linear hydroxyl group-containing polyesters with molecular weight of 800 to 5000.

Suitable hydroxyl group-containing polyesters may be produced, for example, from organic dicarboxylic acids with 1 to 12, preferably 4 to 8 carbon atoms and multifunctional alcohols. Hydroxyl group-containing polyester amides are obtained, for example, from the mentioned dicarboxylic acids and amino alcohols or mixtures of multifunctional alcohols and amino alcohols and/or diamines. The dicarboxylic acid may be of an aliphatic, cycloaliphatic, aromatic or heterocyclic nature. They may be saturated or unsaturated and may, optionally, be substituted for example by halogen atoms or may contain covalently bonded hetero atoms.

Examples include: aliphatic dicarboxylic acids such as succinic acid, glutaric acid, adipic acid, subaric acid, azelaic acid and sebacic acid; aromatic dicarboxylic acids such as phthalic acid, isophthalic acid, terephthalic acid and naphthalene dicarboxylic acid; cycloaliphatic dicarboxylic acid such as hexahydrophthalic acid or endomethylene tetrahydrophthalic acid; and unsaturated dicarboxylic acids such as maleic or fumaric acid. Also useful are hydroxycarboxylic acids such as ε-hydroxycaproic acid.

The dicarboxylic acids may be used individually or in the form of any desired mixture with each other or in sequence. For the production of the hydroxyl group-containing polyesters, it may optionally be advantageous to use the corresponding carboxylic acid derivatives such as dialkyl carboxylates with 1 to 4 carbon atoms in the alcohol radical, carboxylic anhydrides or carboxylic acid chlorides instead of the free carboxylic acid. Optionally, cyclic lactones may also be used.

Examples of multifunctional alcohols are diols with 2 to 16, preferably 4 to 6 carbon atoms which optionally contain heteroatoms and/or may be substituted such as ethylene glycol, propylene glycol and trimethylene glycol, 1,2-, 1,3-, 1,4- and 2,3-butanediol, 1,5-pentanediol, 1,6-hexanediol, 1,8-octanediol, 1,10-decanediol, neopentyl glycol, 2-methyl-1,3-propanediol, 3-methyl-1,5-pentanediol, N-methyldiethanolamine, bis(hydroxyethoxy)benzene, 2,2-bis(hydroxyethoxyphenyl)propane, diethylene glycol, dipropylene glycol and dibutylene glycol and their higher homologs as well as hydroxyl group-containing polyethers with molecular weights between approximately 500 and 2000.

Also suited are amino alcohols and diamines such as ethanolamine, propanolamine, N-methylethanolamine, ethylenediamine, hexamethylenediamine or piperazine which may be used in amounts of up to 20 percent of the diol component as well as tri- and/or higher functional alcohols such as glycerin, trimethylolpropane, hexanetriol, triethanolamine, tripropanolamine, pentaerythritol and similar substances.

Also suited are hydroxyl group-containing polyester of dicarboxylic acids with the above-mentioned alcohols, particularly those with 4 to 6 carbon atoms such as 1,4-butanediol and/or 1,6-hexanediol as well as polymerization products of cyclic lactones such as, optionally substituted, ε-caprolactone.

Suitable higher molecular weight polyethers with 2 to 6, preferably 2 to 3 hydroxyl groups in the molecule and molecular weights of 700 to 10,000, preferably of 800 to 5000, are the polymerization products of alkylene oxides known in accordance with the state of the art such as ethylene oxide, propylene oxide, 1,2- and 2,3-butylene oxide, styrene oxide or epichlorohydrin. Addition products of these alkylene oxides optionally in desired mixtures with each other or in sequence are prepared from starter molecules having 2 to 6 active hydrogen atoms in the molecule. Suitable starter molecules are, for example, water, ammonium, multifunctional alcohols such as ethylene glycol, propylene glycol, butanediol, pentanediol, hexanediol, octanediol, decanediol, glycerin, trimethylolpropane, hexanetriol, pentaerythritol, sorbitol, hydroquinone, 4,4'-dihydroxy-2,2-diphenylpropane, 4,4'-hydroxy-2,2-dicyclohexylpropane, alkanolamines such as ethanolamine, N-alkylethanolamine and multifunctional amines such as ethylenediamine, diethylenetrimaine, piperazine and similar substances.

Also suited are similar polymerization products of cyclic ethers such as tetrahydrofuran, hexamethylene oxide or octamethylene oxide as well as hydroxyl group-containing polybutadiene.

Preferred polyacetals are water insoluble formals such as poly(butanediol formal) or poly(hexanediol formal). Among the polythioethers, particularly the condensation products of thiodiglycol with itself and with other glycols, dicarboxylic acids, amino carboxylic acids or amino alcohols should be mentioned.

The higher molecular weight polyhydroxyl compounds suitable in accordance with this invention may also contain urethane and/or urea groups. Dispersions of natural or synthetic polymers or finely divided mineral suspensions in the above-mentioned polyhydroxyl compounds may also be used.

The higher molecular weight polyhydroxyl compounds may be used alone, in the form of any desired mixtures with each other or in sequence.

Suitable chain extenders with molecular weight below 500, preferably of 60 to 300, are the diols and diamines which are known and commonly used in accordance with the state of the art. Suitable low molecular diols include, for example, the diols mentioned above for the preparation of hydroxyl group-containing polyesters. These diols preferably have a linear structure. Suitable diamines include primary, preferably aromatic diamines and particularly aromatic diamines which are substituted by halogen, $C_1$–$C_4$ alkyl, alkoxy, nitrile, ester, sulfone, sulfonate, nitro groups and such groups having a deactivating effect. Examples include the isomeric phenylene-, toluene- and naphthalinediamines, 4,4'-, 2,4'- and 2,2'-diaminodiphenylmethanes, 4,4'-, 2,4'- and 2,2'-diaminodiphenylethane, anthranilic acid diesters, diaminobenzoate, diaminobenzenesulfonic acid ester, diesters of para-aminobenzoic acid with glycols, diaminobenzonitrile, disulfide and thioether group-containing diamines and similar substances.

As already mentioned, auxiliaries and/or additives may optionally be used for the preparation of the polyurethane elastomers.

Catalysts for accelerating the polyaddition between diisocyanato-1,2-diphenylethane isomers and polyhydroxyl compounds and/or chain extenders, for example, have proven to work well. Examples of suitable catalysts which are commonly used in amounts of 0.001 to 1 percent by weight based on the polyhydroxyl compound include: tertiary amines such as triethylamine, tributylamine, pyridine, N,N-dimethylcyclohexylamine, N-alkylmorpholines, diazabicyclooctane, N,N'-dialkylpiperazine or metal compounds such as iron (III) chloride, tin (II) chloride, iron acetylacetonate, tin dioctoate, dibutyltin dilaurate and tetrabutyl orthotitanate.

Examples of auxiliaries and additives also include: stabilizers against light, heat or discoloration, antioxidants, hydrolysis protection agents, bacteriostats, fungicides, flame retardants, plasticizers, dyes, pigments, as well as organic or inorganic fillers, reinforcing fibers and similar substances.

More detailed data on the above-mentioned auxiliaries and additives may be found in the appropriate literature, for example, the monograph by J. H. Sanders and K. C. Frisch, *High Polymers*, vol. XVI, Polyurethanes, parts 1 and 2, Interscience 1962 and 1964.

For the preparation of urethane elastomers according to the method of this invention, starting materials (a) to (c) are reacted in such quantities that the ratio of isocyanate groups of component (a) to the sum of Zerewitinoff active hydrogen atoms of components (b) and (c) is 0.8 to 1.3, preferably 0.95 to 1.1 and particularly approximately 1. Further, the weight of 4,4'-diisocyanato-1,2-diphenylethane and chain extenders together amounts to 10 to 70 percent of the weight of the polyurethane elastomer.

In accordance with this invention, the polyurethane elastomers may be produced by the economical one-shot method where all starting components optionally in the presence of auxiliaries and/or additives (d) are mixed and the reacting mixture is subsequently introduced into molds and is cured. The polyurethane elastomers can also be produced according to the so-called prepolymer method where a prepolymer with isocyanate groups in the terminal positions is initially prepared from the higher molecular weight polyhydroxyl compound(s) and an excess of the 4,4'-diisocyanato-1,2-diphenylethane or isomer mixture. The prepolymer is then reacted in a second reaction step with one or more additional polyhydroxyl compounds and the chain extender or preferably with chain extenders alone to result in polyurethane elastomers.

In an alterative procedure, it may be advantageous to react only a part of the 4,4'-diisocyanato-1,2-diphenylethane with the higher molecular weight polyhydroxyl compounds to result in a prepolymer and to subsequently add the remaining 4,4'-diisocyanato-1,2-diphenylethane. The latter process is described in German Published Application No. 25 47 866 (U.S. Pat. No. 4,098,773) or German Published Application No. 25 47 864 (U.S. Pat. No. 4,191,818).

In order to produce the polyurethane elastomers according to the one-shot process, the higher molecular weight polyhydroxyl compounds, chain extenders and optionally other auxiliaries and/or additives are mixed with the 4,4'-diisocyanato-1,2-diphenylethane or the isomer mixture at temperatures of 60° C. to 180° C., preferably of 80° C. to 150° C. amd the mixture is briefly evacuated in order to remove air bubbles or dissolved gases. The reacting mixture is then introduced into preheated molds and is cured at temperatures between approximately 80° C. and 150° C. optionally under pressure. In order to achieve optimum properties, the molded parts may be heated for several hours.

When working in accordance with the prepolymer method, the higher molecular weight polyhydroxyl compounds are advantageously initially dried by stirring at elevated temperatures under reduced pressure. They are then reacted with an excess of the 4,4'-diisocyanato-1,2-diphenylethane or an isomer mixture by stirring at temperatures of 60° C. to 180° C., preferably of 80° C. to 150° C. to result in a prepolymer with terminal isocyanate groups. The low molecular weight chain extenders, optionally additional higher molecular weight polyhydroxyl compounds and other auxiliaries and additives, are then stirred into these prepolymers, the mixture homogenized, poured into preheated molds and allowed to cure at 80° C. to 150° C.

The polyurethane elastomers produced in accordance with the invention or molded parts thereof show temperature independent moduli at temperatures from room temperature up to very high temperatures. They have very high softening temperatures and high grade mechanical and thermal properties. The products are, therefore, excellently suited for applications where extreme mechanical and thermal requirements are made of the material such as is the case in high stress rollers and tires, stop buffers, gaskets, wear parts, highly stressable shoe soles, such as those used for sport shoes, damping and coupling elements and similar applications.

The invention is explained in further detail in the following examples.

EXAMPLE 1

In an agitator flask equipped with thermometer and vacuum connection, 300 grams (0.1444 mole) of a polyester having a hydroxyl number of 54 prepared from adipic acid and ethylene glycol was dried at a temperature of 100° C. and 26.6 mbar of pressure while being stirred for a period of one hour. Subsequently, 116.9 grams (0.4428 mole) of 4,4'-diisocyanato-1,2-diphenylethane was stirred in and the mixture was reacted while being stirred at 100° C. for one hour resulting in the prepolymer. Twenty-five grams (0.2775 mole) of 1,4-butanediol was stirred into the melt of this prepolymer, the mixture was briefly evacuated in order to remove gas bubbles, and the homogeneous mixture was poured into double-walled oil heated molds at a temperature of 100° C. producing 5 mm thick panels. After one hour, the panels were demolded and were post cured at 110° C. for 24 hours.

A cloudy, very tough polyurethane elastomer having the following mechanical properties was obtained:

| | | |
|---|---|---|
| Hardness Shore A | (DIN 53 505) | 96 |
| Hardness Shore D | (DIN 53 505) | 47 |
| Tear Strength | (DIN 53 504) | 34.5 N/mm$^2$ |
| Breaking Elongation | (DIN 53 504) | 690 percent |
| Graves Tear Strength | (DIN 53 515) | 95 N/mm |

Between room temperature and 150° C., the shear modulus measured by means of a torsional pendulum was independent of the temperature. The softening temperature measured by thermal mechanical analysis was 190° C.

EXAMPLE 2

Using the procedure of Example 1 but with the following amounts of starting materials: 300 grams (0.1444 mole) of the polyester polyol used in Example 1, 86.17 grams (0.3264 mole) of 4,4'-diisocyanato-1,2-diphenylethane; and 15 grams (0.1665 mole) 1,4-butanediol.

The resultant polyurethane elastomer had the following mechanical properties:

| | | |
|---|---|---|
| Hardness Shore A | (DIN 53 505) | 90 |
| Hardness Shore D | (DIN 53 505) | 37 |
| Tear Strength | (DIN 53 504) | 38 N/mm$^2$ |
| Breaking Elongation | (DIN 53 504) | 590 percent |
| Graves Tear Strength | (DIN 53 515) | 78 N/mm |

At a temperature between 0° and 150° C. the shear modulus measured by means of a torsional pendulum was independent of the temperature. The softening temperature was 180° C.

COMPARISON EXAMPLE

Following the procedure of Example 2, but using 81.6 grams (0.3264 mole) of 4,4'-diisocyanatodiphenylmethane instead of the 4,4'-diisocyanato-1,2-diphenylethane, a polyurethane was obtained which had a hardness of 28 Shore A and/or 22 Shore D (according to DIN 53 505), the shear modulus of which continuously decreased with increasing temperature beginning with room temperature. The thermo mechanical analysis showed that the softening procedure had begun at 50° C. and that the final softening took place at 140° C.

The embodiments of the invention in which an exclusive privilege or property is claimed are defined as follows:

1. In a process for the preparation of a noncellular polyurethane elastomer comprising reacting (a) an organic polyisocyanate; (b) a polyhydroxyl compound having an average functionality of 2 to 6 and an average molecular weight of 700 to 10,000; (c) a chain extender having a molecular weight less than 500 and selected from the group consisting of aliphatic diols, aromatic diamines, and mixtures thereof; and (d) catalysts and other additives; the improvement comprising employing as the organic polyisocyanate 4,4'-diisocyanato-1,2-diphenylethane containing 0 to 5 weight percent of the 2,2'- and 2,4'-isomers in an amount equal to 0.8 to 1.3 isocyanate groups per mole of Zerewitinoff active hydrogen atoms in the combined polyhydroxyl compound and chain extender.

2. The process of claim 1 wherein the weight of the total of 4,4'-diisocyanato-1,2-diphenylethane and chain extenders amounts to 10 to 70 percent of the weight of the polyurethane elastomer.

3. The process of claim 1 wherein the polyhydroxyl compound is a polyester polyol.

4. The process of claim 1 wherein the chain extender is 1,4-butanediol.

5. The polyurethane elastomer produced by the process of claim 2, 3, 4, or 1.

* * * * *